United States Patent
Byun et al.

(10) Patent No.: US 8,530,073 B2
(45) Date of Patent: Sep. 10, 2013

(54) BATTERY MODULE HAVING COMPACT INTERCONNECTION STRUCTURE

(75) Inventors: Sang-Won Byun, Suwon-si (KR);
Tae-Yong Kim, Suwon-si (KR);
Yong-Sam Kim, Suwon-si (KR);
Ji-Hyoung Yoon, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1274 days.

(21) Appl. No.: 11/984,307

(22) Filed: Nov. 15, 2007

(65) Prior Publication Data

US 2008/0182168 A1 Jul. 31, 2008

(30) Foreign Application Priority Data

Jan. 31, 2007 (KR) .......................... 10-2007-0010048

(51) Int. Cl.
*H01M 6/42* (2006.01)
*H01M 2/20* (2006.01)

(52) U.S. Cl.
CPC ...................................... *H01M 2/202* (2013.01)
USPC ............................ 429/160; 429/158; 429/159

(58) Field of Classification Search
USPC ................ 429/158, 159, 60, 160; 439/1, 449
See application file for complete search history.

(56) References Cited

U.S. PATENT DOCUMENTS

| 5,267,866 | A | * | 12/1993 | Swift et al. | 439/31 |
|---|---|---|---|---|---|
| 5,578,392 | A | * | 11/1996 | Kawamura | 429/99 |
| 6,296,970 | B1 | * | 10/2001 | Killebrew et al. | 429/158 |
| 7,270,576 | B2 | * | 9/2007 | Kim et al. | 439/627 |
| 2004/0157120 | A1 | * | 8/2004 | Wu et al. | 429/174 |
| 2004/0265687 | A1 | * | 12/2004 | Chan et al. | 429/152 |
| 2006/0257735 | A1 | * | 11/2006 | Kim | 429/208 |
| 2009/0123830 | A1 | * | 5/2009 | Kato et al. | 429/160 |

FOREIGN PATENT DOCUMENTS

| KR | 10-2005-016540 | 11/2005 |
|---|---|---|
| KR | 10-2006-0061486 | 6/2006 |
| WO | WO 2007004335 A1 * | 1/2007 |

* cited by examiner

*Primary Examiner* — Zachary Best
(74) *Attorney, Agent, or Firm* — Robert E. Bushnell, Esq.

(57) ABSTRACT

A battery module having improved interconnection members to connect rechargeable batteries together and to minimize an increase in a volume of the battery module includes: first and second rechargeable batteries, each having an electrode assembly including a first electrode, a second electrode, and a separator interposed therebetween, and a casing to contain the electrode assembly; a first interconnection member arranged on an upper side surface of the casing of the first rechargeable battery and electrically connected to the first electrode of the first rechargeable battery; and a second interconnection member arranged on a lower side surface of the casing of the second rechargeable battery and electrically connected to the second electrode of the second rechargeable battery, the second interconnection member being connected to the first interconnection member.

17 Claims, 6 Drawing Sheets

BATTERY MODULE HAVING COMPACT INTERCONNECTION STRUCTURE

CLAIM OF PRIORITY

This application makes reference to, incorporates the same herein, and claims all benefits accruing under 35 U.S.C.§119 from an application for BATTERY MODULE earlier filed in the Korean Intellectual Property Office on 31 Jan. 2007 and there duly assigned Serial No. 10-2007-0010048.

BACKGROUND OF THE INVENTION

1. Field of the Invention

The present invention is related to a battery module, and more particularly, the present invention is related to a battery module having interconnection members to connect rechargeable batteries with an improved structure.

2. Description of the Related Art

Generally, a battery module includes a few or several tens rechargeable batteries connected together. The rechargeable battery can be repeatedly charged and discharged because its chemical and electrical energy conversion is reversible. Recently, more and more mobile wireless electronic products are being developed, and a need exists for a rechargeable battery having an increased high energy density as its size and weight are reduced.

Widely used batteries include a nickel-cadmium battery, a nickel-hydrogen battery, a lithium rechargeable battery, and the like. Particularly, the lithium rechargeable battery has an operating voltage of 3.6 V, which is triple that of the nickel-cadmium battery or the nickel-hydrogen battery, and also has a high energy density per unit weight. Therefore, the lithium rechargeable battery is being rapidly popularized as a power source for mobile electronic devices. Such a lithium rechargeable battery can be classified into a lithium ion rechargeable battery, a lithium ion polymer battery, and a lithium polymer battery.

A typical rechargeable battery includes an electrode assembly having a positive electrode, a negative electrode, and a separator interposed therebetween, a casing providing a space for containing the electrode assembly, and a cap assembly combined with the casing to seal the electrode assembly. The rechargeable battery may be manufactured in a variety of shapes such as cylindrical, rectangular, and pouch types depending on the shapes of the electrode assembly and the casing.

The battery module having a plurality of rechargeable batteries having the aforementioned structure and connected together is being widely used as a power source for driving motors of portable miniaturized electronic devices, such as mobile phones, personal computers, camcorders, and hybrid electric vehicles.

The rechargeable batteries forming the battery module are connected together by interconnection members. The interconnection members are disposed at side ends of the rechargeable batteries so as to electrically connect adjacent rechargeable batteries together. Each rechargeable battery includes an element protruding from the side end in order to form the interconnection member, and this element is used to stably fix the interconnection member.

However, the elements disposed at the side end of each rechargeable battery cause an increase in a length of the rechargeable battery, and this also causes an increase in a volume of the battery module. Therefore, for a compact construction of the battery module, there is a need for an improvement in the configuration of the interconnection members for connecting adjacent rechargeable batteries and components for fixing the interconnection members to the rechargeable batteries.

SUMMARY OF THE INVENTION

The present invention provides a battery module having improving interconnection members to connect rechargeable batteries together and elements for fixing the interconnection members to the rechargeable battery and minimizing an increase in a volume of the battery module. 100101 According to an aspect of the present invention, a battery module is provided including: first and second rechargeable batteries, each having an electrode assembly including a first electrode, a second electrode, and a separator interposed therebetween, and a casing to contain the electrode assembly; a first interconnection member arranged on an upper side surface of the casing of the first rechargeable battery and electrically connected to the first electrode of the first rechargeable battery; and a second interconnection member arranged on a lower side surface of the casing of the second rechargeable battery and electrically connected to the second electrode of the second rechargeable battery, the second interconnection member being connected to the first interconnection member.

The battery module preferably further includes an insulating member arranged between the upper side surface of the casing of the first rechargeable battery and the first interconnection member to insulate the first interconnection member from the casing of the first rechargeable battery.

The first interconnection member preferably includes: a first cover including a body portion to cover the insulating member and an engaged portion connected to the body portion and electrically connected to the first electrode of the first rechargeable battery; and a first elongated portion having a side portion attached to the first cover and having another side portion connected to the second interconnection member.

The second interconnection member preferably includes: a second cover to cover a lower side surface of the second rechargeable battery and electrically connected to the second electrode of the second rechargeable battery; and a second elongated portion having a side portion attached to the second cover and having another side portion connected to the first elongated portion.

The battery module preferably further includes a bolt and mating nut to connect the first and second elongated portions together.

The first and second elongated portions preferably further include through-holes into which the bolt is inserted, the through-holes penetrating the first and second elongated portions in a direction of a length of the first and second rechargeable batteries.

The first and second elongated portions preferably alternatively further include through-holes into which the bolt is inserted, the through-holes penetrating the first and second elongated portions in a direction crossing a length of the first and second rechargeable batteries.

The first and second elongated portions are preferably alternatively welded together.

The battery module preferably further includes a hinge mechanism to connect the first and second elongated portions together, the hinge mechanism having a hinge angle preferably in a range of from 10° to 180°.

An upper surface of the casing of the first rechargeable battery and a lower surface of the casing of the second rechargeable battery preferably face the same direction, and the first and second rechargeable batteries are preferably arranged in parallel.

The first and second rechargeable batteries preferably respectively include first and second cylindrical rechargeable batteries.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described in detail with reference to the attached drawings. However, the present invention is not limited to the embodiments described herein, but may be embodied in various forms. Elements that do not correspond to the present invention have not been described in order to provide a simplified description for the present invention in association with the drawings. Like reference numerals denote like elements throughout the entire specification. Also, elements already well known in the art have not been described in detail.

Figure 1:
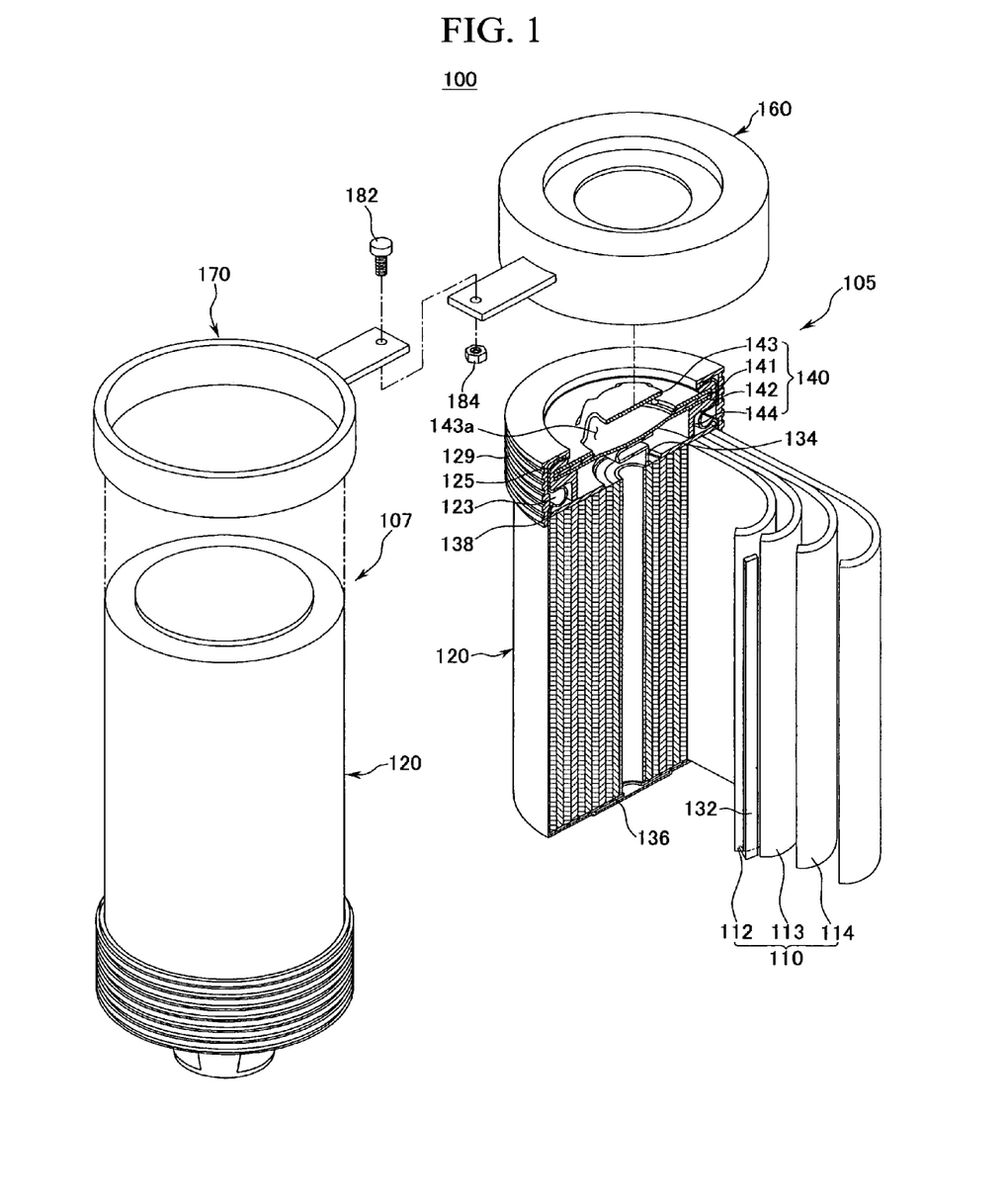
FIG. 1 is an exploded perspective view of a battery module according to a first embodiment of the present invention.

FIG. 1 is an exploded perspective view of a battery module 100 according to a first embodiment of the present invention. The battery module 100 according to the first embodiment of the invention includes first and second lithium ion rechargeable batteries 105 and 107. The configuration of FIG. 1 is provided to explain a principle of the present invention. The present invention is not limited to lithium ion rechargeable batteries. In addition, the battery module according to the present invention may include more than two rechargeable batteries, and such a configuration is also included in the scope of the present invention.

As shown in FIG. 1, the battery module 100 includes the first and second rechargeable batteries 105 and 107 respectively having an electrode assembly 110, a casing 120, and a cap assembly 140, an insulating member 129, a first interconnection member 160, and a second interconnection member 170.

Since the first and second rechargeable batteries 105 and 107 have the same structure in the current embodiment, the features of the first and second rechargeable batteries 105 and 107 are described below based on the first rechargeable battery 105.

The electrode assembly 110 includes a first electrode 114 (a positive electrode) having a charge collector where positive activation materials are attached, a second electrode 112 (a negative electrode) having a charge collector where negative activation materials are attached, and a separator 113 interposed between the positive and negative electrodes 114 and 112 for preventing a short circuit therebetween.

More specifically, the negative electrode 112 is manufactured by coating a slurry type activation material layer obtained by mixing a negative activation material power, a negative binder, a bond, and the like on a charge collector such as a copper plate. In addition, the negative tap 132 is connected to the negative electrode 112 and makes contact with an internal bottom surface of the casing 120. As a result, the casing 120 can function as a negative terminal of the first rechargeable battery 105. Needless to say, it would be apparent to those skilled in the art that a negative charge collector (not shown) instead of the negative tap 132 may be connected to the negative electrode 112.

The positive electrode 114 is manufactured by uniformly coating a slurry type activation material layer obtained by mixing a positive activation material power, a positive binder, a positive conductive additive, and the like on a charge collector such as an aluminum plate. A positive tap 134 is connected to the positive electrode 114, extended away from the positive electrode 114, and then connected to a safety vent 142 of the cap assembly 140. Needless to say, a positive charge collector (not shown) instead of the positive tap 134 may be connected to the positive electrode 114. In this case, a lead tap (not shown) of the positive charge collector is connected to the cap assembly 140.

The separator 113 separates the positive and negative electrodes 112 and 114 from each other, and provides a circulation path for the lithium ions. The separator 113 may be a single layered film formed of polyethylene, polypropylene, or polyvinylidene fluoride, a multi-layered film having two or more layers formed of polyethylene, polypropylene, or polyvinylidene fluoride, or a mixed multi-layered film such as a polyethylene/polypropylene double layered separator, a polyethylene/polypropylene/polyethylene triple layered film, and a polypropylene/polyethylene/polypropylene triple layered separator.

This electrode assembly 110 may be obtained by sequentially stacking the negative electrode 112, the separator 113, and the positive electrode 114, combining a center rod (not show) with the end of the stack, and winding them in a cylindrical shape. The resultant electrode assembly 110 may be inserted into the casing 120, which will be described later, and then, the center rod removed from the electrode assembly 110. A vacant space formed by the removal of the center rod may be filled with a center pin (not shown).

Upper and lower insulation plates 138 and 136 are respectively installed on upper and lower sides of the aforementioned electrode assembly 110 in order to prevent an unnecessary electrical short between the electrode assembly 110 and the casing 120.

The casing 120 includes an internal space for containing the electrode assembly 110 in a cylindrical shape, and is formed of a conductive metallic material, such as aluminum, aluminum alloy, and steel plated with nickel. The casing 120 has an open top surface, into which the electrode assembly 110 can be inserted.

The opened top surface of the casing 120 is combined with the cap assembly 140 to seal the casing 120. In the process of combining the casing 120 and the cap assembly 140, the casing 120 is provided with a bead portion 123 and a crimped portion 125.

The internal space of the sealed casing 120 is filled with electrolyte (not shown), which allows the lithium ions generated by an electrochemical reaction to move between the positive and negative electrodes 112 and 114 during the charge/discharge operations.

The cap assembly 140 includes an electrode cap 143, a positive temperature coefficient element 141, a safety vent 142, an electrode cap 143, and a gasket 144.

The gasket 144 covers side surfaces of the conductive electrode cap 143, the positive temperature coefficient element 141, and the safety vent 142 and is disposed between them and the casing 120 to insulate them from the casing 120.

The safety vent 142 has a lower surface where the positive tap 134 extracted from the positive electrode 114 is attached using a bonding process, such as a welding. The safety vent 142 is upwardly switched to cut off electrical connection with the positive electrode 114 when an internal pressure of the first rechargeable battery 105 exceeds a predetermined value. Although the safety vent 142 and the positive tap 134 are directly connected together in the current embodiment, it would be apparent to those skilled in the art that an insulation member (not shown) and a cap plate (not shown) may be further sequentially stacked under the safety vent 142, and the positive tap 134 connected to the cap plate.

The positive temperature coefficient element 141 is connected to an upper portion of the safety vent 142. An electrical resistance of the positive temperature coefficient element 141 increases to a nearly infinite level when its temperature exceeds a predetermined level. Therefore, it can be used to stop a charge/discharge current flow when the temperature of the first rechargeable battery 105 increases beyond a predetermined level. When the temperature of the first rechargeable battery 105 lowers to below a predetermined level, the electrical resistance of the positive temperature coefficient element 141 is reduced again. Accordingly, the functions of the first rechargeable battery 105 can be recovered.

The electrode cap 143 is connected to an upper portion of the positive temperature coefficient element 141 and serves as a positive terminal to externally supply the current. The side surface of the electrode cap 143 is provided with a degassing hole 143a which allows an internal gas of the first rechargeable battery 105 to be ventilated when the safety vent 142 is opened.

The insulating material 129 is formed on an upper side surface of the first rechargeable battery 105 having the aforementioned structure. The insulating material 129 has functions of maintaining insulation between the electrodes and absorbing vibration. In addition, the insulating material 129 cuts off electrical connection between the first interconnection member 160 and the casing 120. Although the second rechargeable battery 107 is not provided with an insulating member 129 in the current embodiment, it would be apparent to those skilled in the art that the insulating member may be provided with the second rechargeable battery 107.

The first interconnection member 160 covers a side surface of the insulating member 129 provided to the first rechargeable battery 105 and is electrically connected to the electrode cap 143. The second interconnection member 170 is formed to cover a lower side surface of the casing 120 of the second rechargeable battery 107. The second interconnection member 170 is combined with the first interconnection member 160 by a bolt 182 and a nut 184, so that the first and second rechargeable batteries 105 and 107 are electrically connected with each other.

Figure 2:
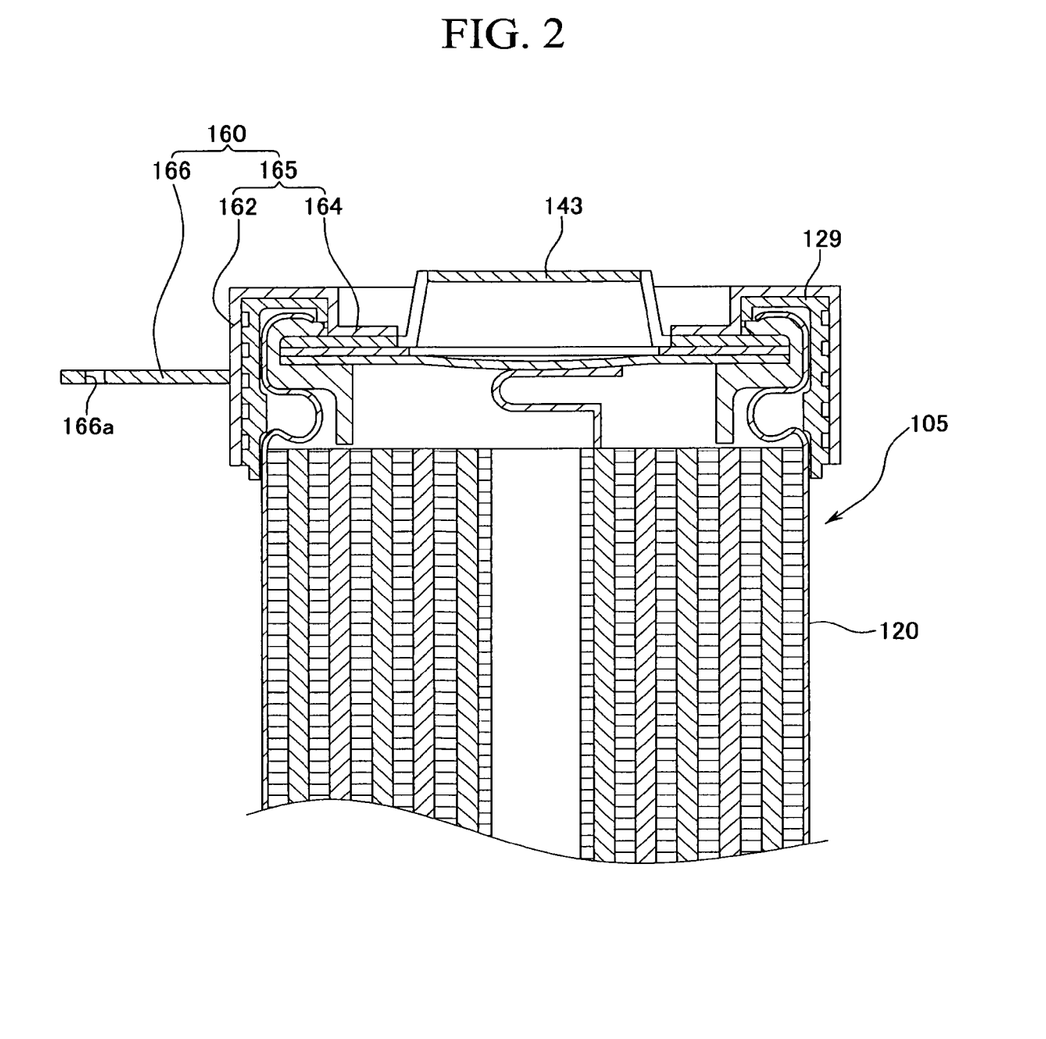
FIG. 2 is a view of a first rechargeable battery connected to a first interconnection member of FIG. 1.

FIG. 2 is a view of the first rechargeable battery 105 connected to the first interconnection member 160 of FIG. 1. As shown in FIG. 2, the first interconnection member 160 includes a first cover 165 and a first elongated portion 166.

The first cover 165 includes a body portion 162 for covering the insulating member 129 and an engaged portion 164 that is combined with the body portion 162 and electrically connected to the electrode cap 143.

The first elongated portion 166 protrudes from the body portion 162 and is provided with a first through-hole 166a into which the bolt 182 (see FIG. 1) is inserted. The first through-hole 166a is formed in the first elongated portion 166 in a direction of a length of the first rechargeable battery 105. The first elongated portion 166 is engaged with a second elongated portion 176 (see FIG. 3) which will be described later, and accordingly, the first and second rechargeable battery 105 and 107 can be electrically connected to each other.

The first interconnection member 160 having the aforementioned construction is electrically connected to the positive electrode of the first rechargeable battery 105. More specifically, since the engaged portion 164 of the first cover 165 is fixed to the electrode cap 143 having a function of a positive terminal, the first interconnection member 160 can be electrically connected to a positive electrode of the first rechargeable battery 105. The body portion 162 of the first cover 165 is disposed to cover the side surface of the insulating member 129, so that the first interconnection member 160 is insulated from the casing 120 having a function of a negative terminal.

Figure 3:
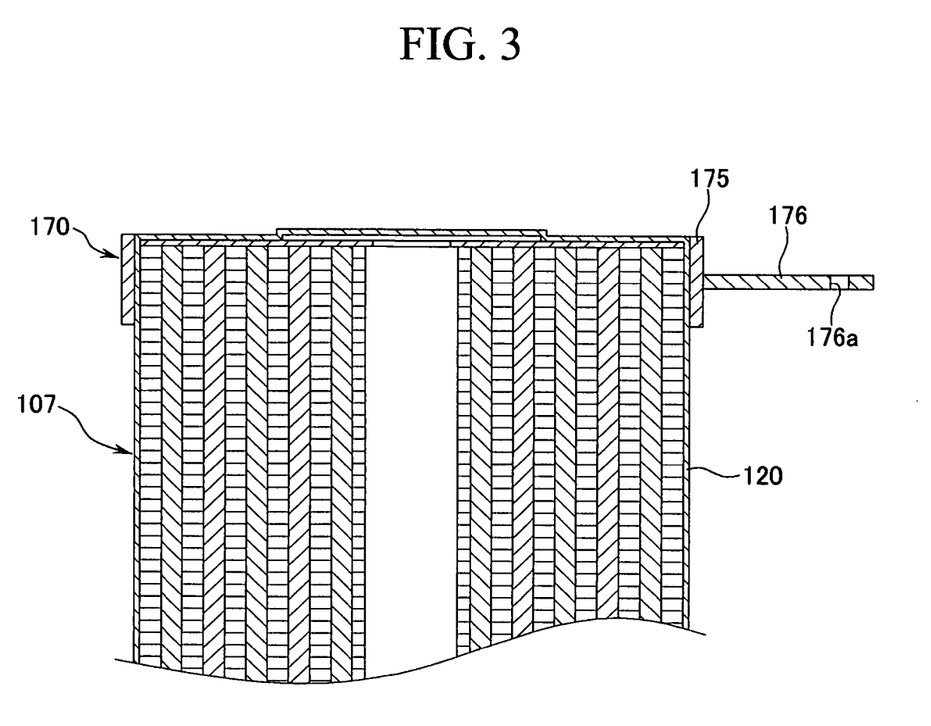
FIG. 3 is a view of a second rechargeable battery connected to a second interconnection member of FIG. 1.

FIG. 3 is a view of the second rechargeable battery 107 connected to the second interconnection member 170 of FIG. 1. As shown in FIG. 3, the second interconnection member 170 includes a second cover 175 and a second elongated portion 176.

The second cover 175 is formed in a shape of an open-ended cylinder disposed to cover a lower side surface of the casing 120 of the second rechargeable battery 107. As described above, the second cover 175 is directly connected to the casing 120 having a function of a negative terminal of the second rechargeable battery 107, so that the second interconnection member 170 can be electrically connected to a negative electrode of the second rechargeable battery 107.

A side portion of the second elongated portion 176 is fixed to the second cover 175, and the other side portion is combined with the first elongated portion 166 (see FIG. 2). The second elongated portion 176 is provided with a second through-hole 176a into which the bolt 182 (see FIG. 1) is inserted. The second through-hole 176a is formed in the second elongated portion 176 in a direction of a length of the second rechargeable battery 107 and disposed to be aligned with the first through-hole 166a of the first elongated portion 166.

As described above, the second elongated portion 176 is combined with the first elongated portion 166 of the first rechargeable battery 105, so that the first and second rechargeable batteries 105 and 107 are electrically connected to each other. In the current embodiment, the second and first elongated portions 176 and 166 are combined by the bolt 182 penetrating the second and first through-holes 176a and 166a and the nut 184 (see FIG. 1) mated with the bolt 184 (see FIG. 1).

In the current embodiment, according to the aforementioned constructions, although the first and second rechargeable batteries 105 and 107 are connected to each other, the length of the rechargeable batteries is not increased due to the improved first and second interconnection members 160 and 170, and this means that a volume of the battery module 100 having a plurality of the rechargeable batteries does not increase.

Figure 4:
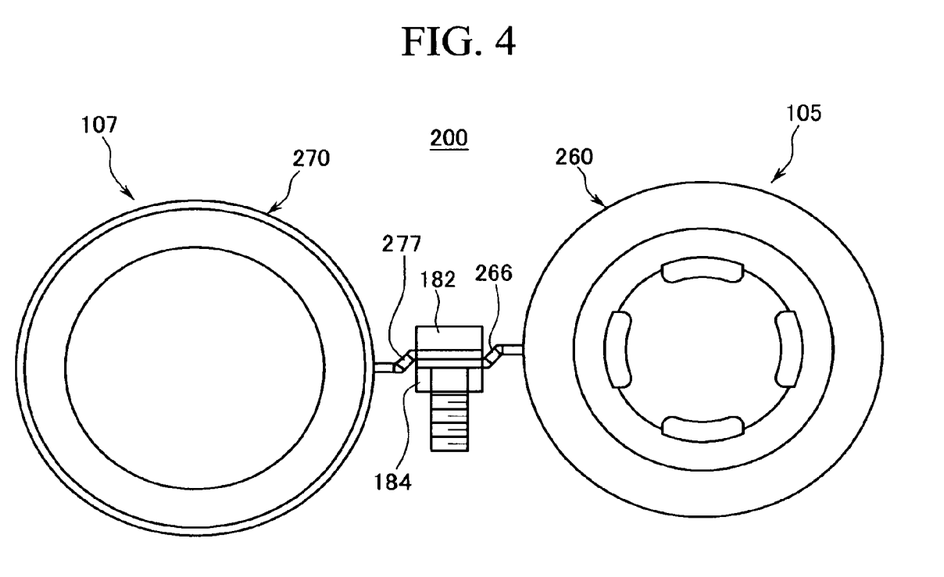
FIG. 4 is a top plan view of a battery module according to a second embodiment of the present invention.

As shown in FIG. 4, a first through-hole formed in a first elongated portion 266 and a second through-hole formed in a second elongated portion 277 maybe formed in a direction crossing the length of the first and second rechargeable batteries 105 and 107. More specifically, according to a battery module 200 in the second embodiment, a bolt 182 penetrates the first and second through-holes in the direction crossing the length of the first and second rechargeable batteries 105 and 107, and a nut 184 is mated with the bolt 182, so that first and second interconnection members are connected.

Figure 5:
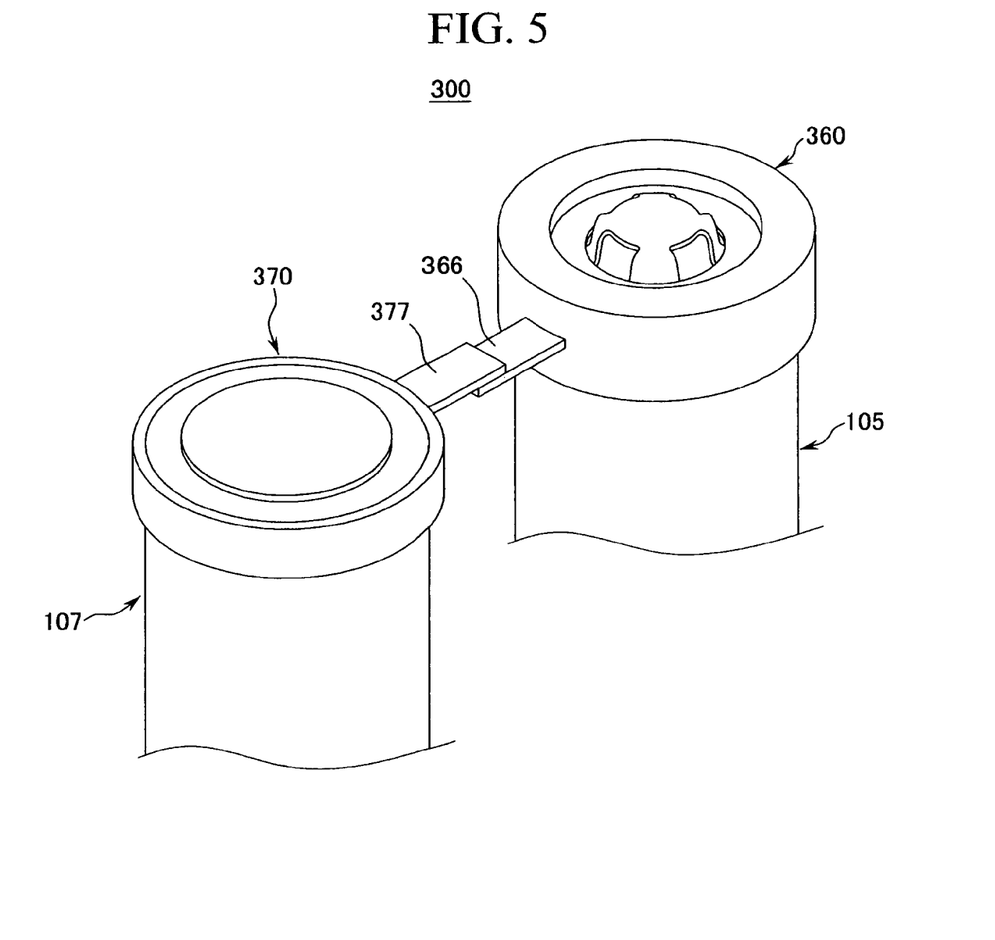
FIG. 5 is a perspective view of a battery module according to a third embodiment of the present invention.

In addition, as shown in FIG. 5, first and second interconnection members 360 and 370 are combined by performing a resistance welding or a laser welding. More specifically, according to a battery module 300 in the third embodiment, a first elongated portion 366 of the first interconnection member 360 is combined with a second elongated portion 377 of the second interconnection member 370 by performing a welding, so that the first and second rechargeable batteries 105 and 107 can be electrically connected.

Figure 6:
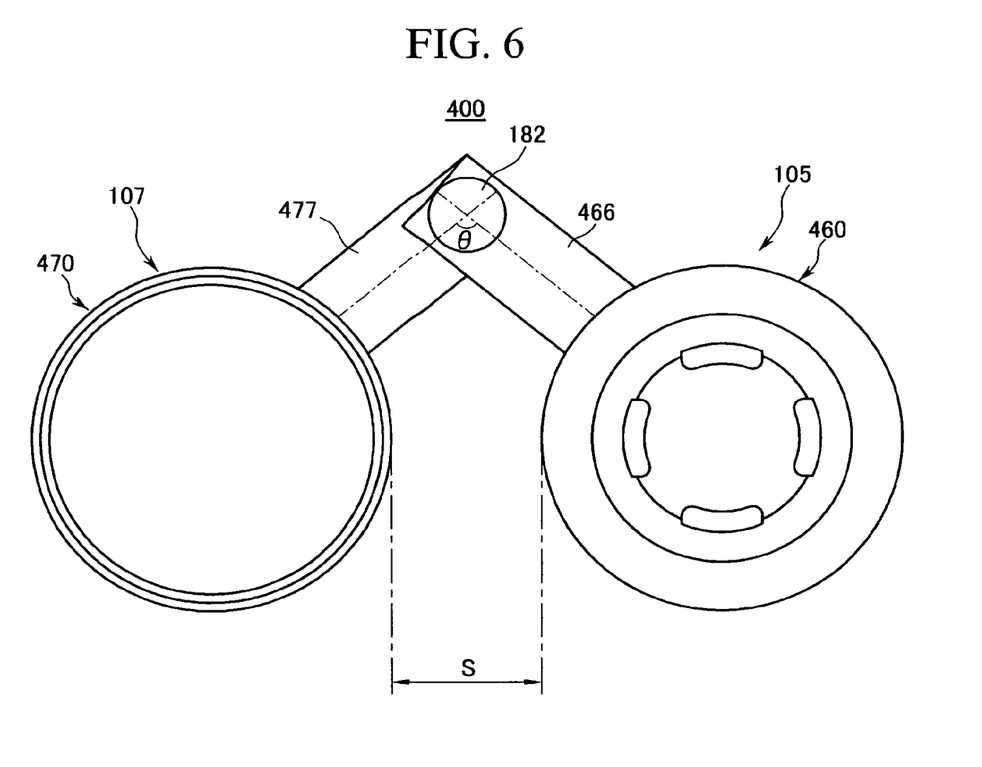
FIG. 6 is a top plan view of a battery module according to a fourth embodiment of the present invention.

FIG. 6 is a top plan view showing a battery module 400 according to a fourth embodiment of the present invention. Referring to FIG. 6, first and second interconnection members 460 and 470 are combined by a bolt 182 and a nut (not shown). In addition, an included angle θ between a center line of the first elongated portion 466 in a length direction and a center line of the second elongated portion 477 in a length direction is formed to be in a range of from 10° to 180°. According to the fourth embodiment, the included angle θ is controlled so as to freely control a distance s between the first and second rechargeable batteries 105 and 107. In other words, according to a size of a device applying the battery module 400, the distance between the first and second rechargeable batteries 105 and 107 can be controlled to correspond to the size, so that an adaptability of the battery module 400 for the device applying the battery module 400 can increase.

Other technical features may be similarly applied as in the aforementioned first embodiment.

As described above, according to the embodiments of the present invention, due to the improved first and second interconnection members, although a plurality of the rechargeable batteries are connected together, the length of the rechargeable batteries is not increased.

In addition, according to the embodiments of the present invention, a distance between adjacent rechargeable batteries can be controlled so that the entire size of the battery module can be freely determined. In other words, there is an advantage in that an adaptability of the battery module for a device applying the battery module increases.

Although the exemplary embodiments of the present invention have been described, the present invention is not limited to these embodiments, but may be modified in various ways without departing from the scope of the appended claims.

What is claimed is:

1. A battery module, comprising:
    first and second rechargeable batteries, each having an electrode assembly including a first electrode, a second electrode, and a separator interposed therebetween, and a casing to accommodate the electrode assembly, the casing being comprised of a conductive metal, one of the first electrode and the second electrode being electrically connected to the casing, the casing having a bottom wall opposite to an opening at a top side and a sidewall extending from the bottom wall to the opening, the bottom wall of the casing corresponding to a bottom surface of each of the first and second rechargeable batteries, the first and second rechargeable batteries each including a cap assembly arranged within the opening of the casing to seal the electrode assembly within the casing, the cap assembly including an electrode cap on a top side thereof and being electrically connected to an other of the first electrode and the second electrode, the top side of the cap assembly corresponding to a top surface of each of the first and second rechargeable batteries, the sidewall of the casing together with a sidewall of the cap assembly corresponding to a side surface of each of the first and second rechargeable batteries;
    a first interconnection member including a body portion arranged on and covering an upper portion of the side surface of the first rechargeable battery and an engaging portion connecting the body portion to the electrode cap; and
    a second interconnection member connected to the first interconnection member and including a body portion arranged on and covering a lower portion of the side surface of the second rechargeable battery and being electrically connected to the casing of the second rechargeable battery, wherein the first and second interconnection members do not add any length to the battery module and are arranged between the top side of the cap assembly and the bottom wall of each of the first and second rechargeable batteries.

2. The battery module of claim 1, further comprising an insulating member arranged between the body portion of the first interconnection member and the upper portion of the side surface of the first rechargeable battery to electrically insulate the first interconnection member from the casing of the first rechargeable battery.

3. The battery module of claim 2, wherein the first interconnection member further comprises an elongated portion having a first end attached to the body portion of the first interconnection member and a second and opposite end attached to the second interconnection member.

4. The battery module of claim 3, wherein the second interconnection member further comprises an elongated portion having a first end attached to the body portion of the second interconnection member and a second and opposite end attached to the elongated portion of the first interconnection member at a location in between adjoining portions of the side surfaces of the first and second rechargeable batteries.

5. The battery module of claim 4, further comprising a bolt and mating nut to connect elongated portions of each of the first and second interconnection members together.

6. The battery module of claim 5, wherein the elongated portions of each of the first and second interconnection members further comprise through-holes into which the bolt is inserted, the through-holes penetrating the elongated portions in a direction of a length of the first and second rechargeable batteries.

7. The battery module of claim 5, wherein the elongated portions of each of the first and second interconnection members further comprise through-holes into which the bolt is inserted, the through-holes penetrating the elongated portions in a direction crossing a length of the first and second rechargeable batteries.

8. The battery module of claim 4, wherein the elongated portions of each of the first and second interconnection members are welded together.

9. The battery module of claim 4, further comprising a hinge mechanism to connect the elongated portions of each of the first and second interconnection members together, the hinge mechanism having a hinge angle in a range of from 10° to 180° to control a distance between the first and second rechargeable batteries.

10. The battery module of claim 1, wherein the upper portion of the side surface of the first rechargeable battery and the lower portion of the side surface of the second rechargeable battery are arranged adjacent to each other, and wherein the first and second rechargeable batteries are arranged in parallel.

11. The battery module of claim 1, wherein the first and second rechargeable batteries respectively comprise first and second cylindrical rechargeable batteries.

12. The battery module of claim 1, wherein the body portions of each of the first and second interconnection members comprises a cylindrical shape that corresponds to the side surface of the first and second rechargeable batteries.

13. A battery module, comprising:
a first cylindrical rechargeable battery and a second cylindrical rechargeable battery, each of the first and second cylindrical batteries including a cylindrically wound electrode assembly arranged within a casing, the cylindrically wound electrode assembly including a separator arranged between a first electrode and a second electrode, the casing including a bottom wall corresponding to a bottom surface of each of the first and second rechargeable batteries, an opening opposite the bottom wall and a sidewall extending from the bottom wall to the opening, the first and second cylindrical rechargeable batteries further including a cap assembly arranged within the opening of the casing to seal the electrode assembly within, the cap assembly including an electrode cap arranged on an exterior portion of a top side of the cap assembly and corresponding to a portion of a top surface of each of the first and second rechargeable batteries and being electrically connected to one of the first and second electrodes, the casing being comprised of a conductive metal and being electrically connected to an other of the first and second electrodes, the sidewall of the casing together with a sidewall of the cap assembly corresponding to a side surface of each of the first and second rechargeable batteries;
an insulating member arranged on and covering an upper portion of the side surface of the first rechargeable cylindrical battery;
a first interconnection member including a body portion arranged on and covering the upper portion of the side surface of the first cylindrical rechargeable battery and an engaging portion connected to the body portion and to the electrode cap by extending onto the top surface of the first cylindrical rechargeable battery, the insulating member being arranged between the body portion of the first interconnection member and the upper portion of the side surface of the first cylindrical rechargeable battery and electrically insulating the first interconnection member from the casing of the first cylindrical rechargeable battery; and
a second interconnection member having a body portion arranged on and covering a lower portion of the side surface of the second cylindrical rechargeable battery, the second interconnection member being electrically connected to the casing of the second rechargeable battery and the first interconnection member, wherein each of the first and second interconnection members further comprise an elongated portion having a first end connected to the body portion of the corresponding one of the first and second interconnection members and extending radially outwards and a second and opposite end connected to each other at a location between the side surfaces of each of the first and second rechargeable batteries and at a location between the bottom wall the top side of the cap assembly of each of the first and second rechargeable batteries.

14. The battery module of claim 13, wherein the body portions of each of the first and second interconnection members includes an open-ended cylindrical shape.

15. A battery module, comprising:
a first cylindrical rechargeable battery;
a second cylindrical rechargeable battery arranged in parallel to the first cylindrical rechargeable battery; and
a first interconnection member having a body having an annular ring shape and arranged over a portion of a sidewall of a casing of the first cylindrical rechargeable battery and a second interconnection member having a body having an annular ring shape and being arranged over portion of a portion of a sidewall of a casing of the second cylindrical rechargeable battery, wherein the first interconnection member is connected to the second interconnection member to electrically connect the first cylindrical rechargeable battery to the second cylindrical rechargeable battery, wherein the casing of each of the first and second cylindrical rechargeable batteries being comprised of a conductive metal, the second interconnection member being in direct contact with and being electrically connected to the casing of the second cylindrical rechargeable battery, the first interconnection member being electrically insulated from the casing of the first cylindrical rechargeable battery by an annular ring-shaped insulating member arranged in between the first interconnection member and the portion of the sidewall of the casing of the first cylindrical rechargeable battery, wherein the first interconnection member is electrically connected to the second interconnection member in a manner that does not add to a length of the battery module by arranging said electrical connection between the sidewall of the casing of the first cylindrical rechargeable battery and the sidewall of the casing of the second cylindrical rechargeable battery.

16. The battery module of claim 15, wherein each of the first and second interconnection members further include an elongated portion having a first end connected to and extending radially outwards from the respective body portions of the first and second interconnection members.

17. The battery module of claim 15, wherein only the first cylindrical rechargeable battery comprises the annular ring-shaped insulating member.

* * * * *